UNITED STATES PATENT OFFICE.

WALLACE APPLETON BEATTY, OF NEW YORK, N. Y., ASSIGNOR, BY DIRECT AND MESNE ASSIGNMENTS, OF THREE-TWENTIETHS TO HORACE HERBERT SMITH AND ONE-HALF TO JAMES DUDLEY DUSENBERRY, BOTH OF NEW YORK, N. Y., AND ONE-TENTH TO THOMAS A. WITHERSPOON, OF WASHINGTON, DISTRICT OF COLUMBIA.

PROCESS OF IMPREGNATING POROUS SUBSTANCES.

1,134,436.  Specification of Letters Patent.  Patented Apr. 6, 1915.

No Drawing.   Application filed August 26, 1913.  Serial No. 786,814.

*To all whom it may concern:*

Be it known that I, WALLACE APPLETON BEATTY, a citizen of the United States, residing at New York, in the county of New York and State of New York, have invented certain new and useful Improvements in Processes of Impregnating Porous Substances; and I do hereby declare the following to be a full, clear, and exact description of the invention, such as will enable others skilled in the art to which it appertains to make and use the same.

This invention relates to a novel process of impregnating wood, paper, leather and other porous substances as well as to the novel products produced by said process, and has for its object to provide a process which will be simple and efficient as well as to produce products which will be less costly and more serviceable than are the similar products now in use.

To these ends the invention consists in the novel steps constituting my process and in the novel products more fully hereinafter disclosed and particularly pointed out in the claims.

In carrying out my process, I preferably thoroughly dry the wood, paper, leather or other porous substance to be impregnated by subjecting it to heat in a chamber from which the air is being exhausted, so that the vacuum thus produced will permit the escape of the moisture or other material filling the pores, and thereupon leave them open. The heat employed will vary with the nature of the substance being impregnated, and of course it is so regulated as not to injuriously affect said substance for the purpose in hand. In the case of ordinary woods, I find that a moderate vacuum and the heat from steam at a gage pressure of from 10 lbs. to 15 lbs. yields good results. But, of course, by raising the vacuum and increasing the heat, the substance will be rendered more porous. After the pores have been thus opened, I subject the material to the action of a new synthetic gum formed as a condensation product by the action of formaldehyde on dioxydiphenyl-dimethyl-methane in the presence of alkalis or acids all as is set forth in my copending application #702,046, filed June 6, 1912 entitled Condensation product and process of making same. This gum may be applied to the material to be impregnated in a pure and liquid state; or diluted with solvents such as those mentioned in my said application. I prefer however, in most instances to employ a pressure sufficient to accelerate the operation. In the case of woods, I find a pressure of from 75 to 100 lbs. produces satisfactory results. The time of contact between the liquid and the material is regulated according to the degree of impregnation desired. I prefer to remove the impregnating liquid, and subject the substance to heat and pressure, or to heat in the absence of pressure, or to ordinary temperatures in the absence of pressure, according to the nature of the material and the results desired. If a thorough impregnation is desired in the case of small pieces of ordinary woods, with a temperature of 300° F., a pressure of 75 to 100 lbs. and a fairly liquid gum or solution, I find satisfactory results in from an hour and a half to two hours.

Non metallic substances impregnated as above are found to be electrical insulators; water proof; they take a high polish; they resist acids and alkalis; are inactive toward hot oils; and are very much less inflammable than were the original substances. In fact, cheaper grades of woods thus impregnated are greatly increased in weight and hardness and very closely resemble in appearance and useful qualities the higher and most expensive grades of wood. Especially is this the case when the said synthetic gum is suitably colored (as it may be by adding coloring matter to the solution) to resemble the said higher grades of wood.

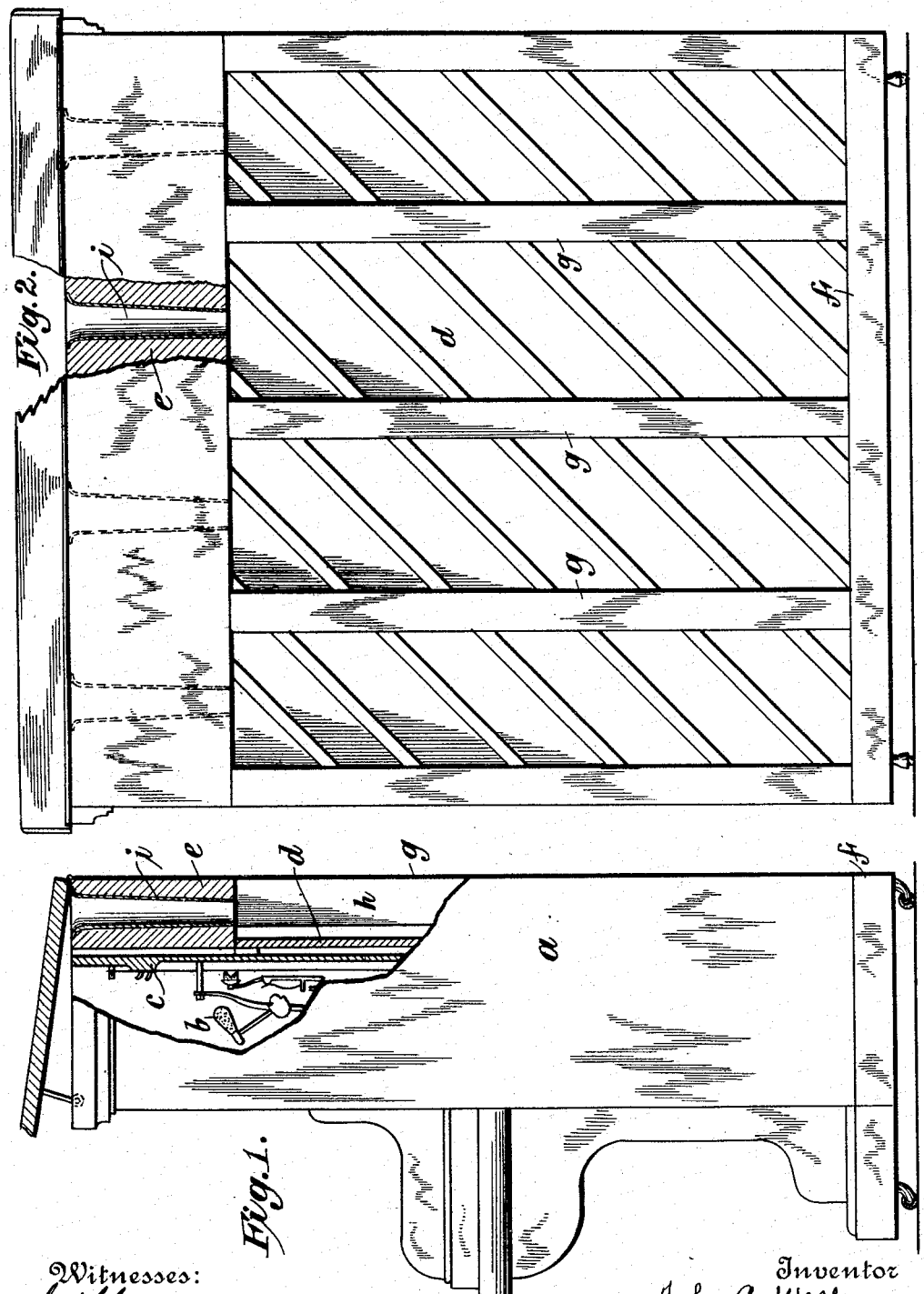

In addition to the above, woods may be given a highly artistic appearance by adding various salts to the gum solution and especially when reagents in small quantities are used which will liberate one or more constituents of said salts into the grain of the woods. In such cases the closeness of the grain in different parts acts as a sort of filter to vary the color effects of the salts, as will be readily understood. But whether wood, paper, cloth, leather or other porous substances are employed, in each instance a new product is produced which has the